(12) United States Patent
Sanada (10) Patent No.: US 7,237,850 B2
(45) Date of Patent: Jul. 3, 2007

(54) FLUID CONTROL APPARATUS (75) Inventor: Satoshi Sanada, Kariya (JP)

(73) Assignee: Advics Co., Ltd., Aichi-ken (JP)

( * ) Notice: Subject to any disclaimer, the term of this patent is extended or adjusted under 35 U.S.C. 154(b) by 487 days.

(21) Appl. No.: 10/944,705

(22) Filed: Sep. 21, 2004

(65) Prior Publication Data
US 2006/0076825 A1   Apr. 13, 2006

(51) Int. Cl.
*B60T 8/36* (2006.01)
(52) U.S. Cl. ............................. 303/119.2; 303/DIG. 10
(58) Field of Classification Search ............ 303/119.2, 303/119.3, DIG. 10
See application file for complete search history.

(56) References Cited

U.S. PATENT DOCUMENTS 6,124,775 A  *  9/2000  Linkner, Jr. ................. 335/278

6,719,267 B2     4/2004  Torii et al.

* cited by examiner

*Primary Examiner*—Melanie Torres
(74) *Attorney, Agent, or Firm*—Posz Law Group, PLC (57) ABSTRACT

In a fluid control apparatus having coil-supporting protruding portions on one end surface of a case, where each coil-supporting protruding portion is deformed by pressing a coil portion with a pressing jig to the coil-supporting protruding portion, in a state where the other end surface of the case is supported by a supporting jig, the fluid control apparatus includes jig-supporting protruding portions on the other end surface of the case, such that the supporting jig abuts with the jig-supporting protruding portions only. When an area that abuts with the supporting jig is narrow, it is easy to increase accuracy in flatness even in a case of resin molding. Furthermore, when accuracy in flatness of the jig-supporting protruding portions is enhanced, a necessity for adjusting the supporting jig so as to match waviness of the case as in the conventional case is eliminated, whereby the supporting jig can be easily produced.

8 Claims, 6 Drawing Sheets

FLUID CONTROL APPARATUS

FIELD OF THE INVENTION

The present invention relates to a fluid control apparatus in which a fluid passage is opened and closed by a solenoid valve. For example, the present invention is preferably applied to an anti-lock brake system actuator of an anti-lock brake system (hereinafter referred to as ABS) in which a tendency to lock wheels is avoided by increasing and decreasing a brake fluid pressure of a vehicle.

BACKGROUND OF THE INVENTION

In a conventional ABS actuator, a fluid passage through which brake fluid flows is formed in a housing, and opened and closed by a solenoid valve. Furthermore, the solenoid valve is retained between the housing and a case (i.e. cover) made of resin. The case is provided with a protruding portion for supporting a coil (hereinafter referred to as coil-supporting protruding portion), which protrudes towards a brim portion of a yoke so as to abut with the brim portion. A coil height, that is, a distance between a contact surface (i.e. datum surface) and an end surface of the yoke on a side of the housing is adjusted to a predetermined value by pressing the coil-supporting protruding portion (for example, as disclosed in Japanese Patent Laid-Open Publication No.2002-243056).

Figure 7:
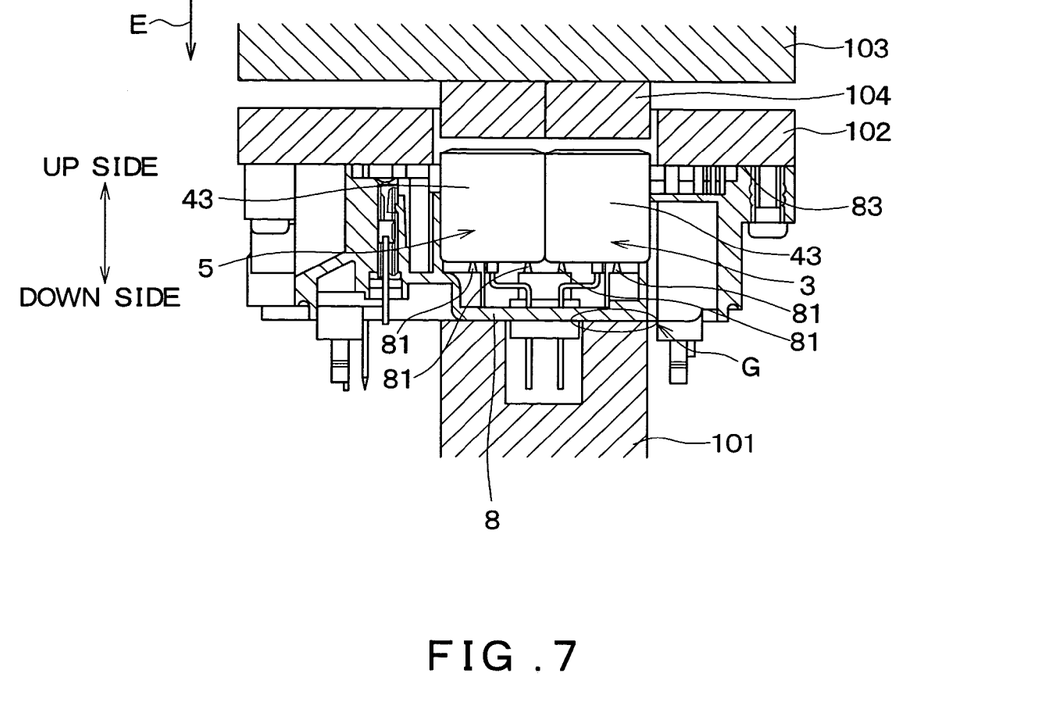
FIG. 7 is a sectional view showing an adjustment process of a coil height of a conventional pressure increase control valve.
Figure 8:
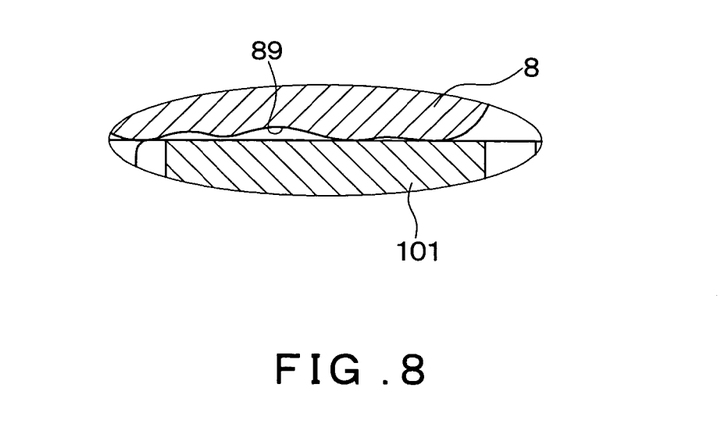
FIG. 8 is an expanded sectional view of portion G in FIG. 7.

The coil height is adjusted before the solenoid valve is retained between the housing and the case. Specifically, as shown in FIG. 7, a punch 104 of a pressing jig 103 is caused to abut with a yoke 43 in a state where a case 8 is supported by a supporting jig 101. Then, the yoke 43 is pressed toward a side of a coil-supporting protruding portion 81 until the pressing jig 103 abuts with a datum plate 102, whereby the coil-supporting protruding portion 81 is deformed.

However, in the conventional ABS actuator as described above, since the case 8 is a resin mold product, waviness (concave and convex) appears on a contact surface 89 of the case 8 with the supporting jig 101, in other words, accuracy in flatness of the case 8 is not high. Therefore, it is difficult to cause the contact surface 89 of the case 8 and a contact surface of the supporting jig 101 to be in contact with each other before the case 8 is pressed by the pressing jig 103. Accordingly, the case 8 is bent when pressed by the pressing jig 103, and it returns to an original wavy shape when a press load is removed. This bending and restoration of the case 8 causes a wrong coil height.

Meanwhile, in resin molding, it is difficult to adjust a die to be used for molding (hereinafter referred to as molding die) such that accuracy in flatness of an entire wide surface becomes high. Therefore, an attempt is made to reduce bending of the case 8 when it is pressed, by adjusting the supporting jig 101 so as to match the waviness of the case 8, whereby the contact surface of the case 8 and that of the supporting jig 101 are in contact with each other as close as possible. Despite this attempt, it is not easy to adjust the supporting jig 101 over the entire contact surface thereof with the case 8.

SUMMARY OF THE INVENTION

It is an object of the present invention to easily make a supporting jig which is used for adjusting a coil height.

According to an aspect of the present invention, protruding portions for supporting a jig (hereinafter referred to as jig-supporting protruding portions) are provided on the other end surface of a case other than an end surface on which coil-supporting protruding portions are provided. The jig-supporting protruding portions protrude from the end surface of the case and abut with a supporting jig.

According to this configuration, since the jig-supporting protruding portions are formed into a protruding shape, the supporting jig only abuts with the jig-supporting protruding portions of the end surface of the case. In other words, only a narrow area of the case abuts with the supporting jig. Since the portion that abuts with the supporting jig is narrow as above, even in the case of a resin mold part, it is easy to adjust a molding die so that accuracy in flatness increases. Therefore, it is easy to make the case having the jig-supporting protruding portions with high accuracy in flatness. Moreover, since accuracy in flatness of the jig-supporting protruding portions increase, a necessity for adjusting the supporting jig so as to match the waviness of the case as in the conventional case is eliminated, thereby facilitating easy making of the supporting jig.

Furthermore, it is preferable that each of the jig-supporting protruding portions has a larger sectional area than each of the coil-supporting protruding portions.

According to this configuration, it is possible to inhibit deformation of the jig-supporting protruding portions caused by a press load when the coil height is adjusted. Accordingly, adjustment accuracy for the coil height can be enhanced.

Furthermore, it is preferable that the coil-supporting protruding portions and the jig-supporting protruding portions overlap each other, when viewed in the direction where the pressing jig presses the coil portion.

According to this configuration, bending of the case in the vicinity of the coil-supporting protruding portions is inhibited when the coil height is adjusted, whereby adjustment accuracy for the coil height can be further enhanced.

Furthermore, it is preferable that the jig-supporting protruding portions and the coil-supporting protruding portions are coaxially disposed, when viewed in the direction where the pressing jig presses the coil portion.

According to this configuration, bending of the case in the vicinity of the coil-supporting protruding portions is inhibited more reliably when the coil height is adjusted, whereby adjustment accuracy for the coil height can be yet further enhanced.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

The present invention will be described further with reference to various embodiments in the drawings. Hereafter, an embodiment of the present invention will be explained with reference to FIGS. 1 to 6.

Figure 1:
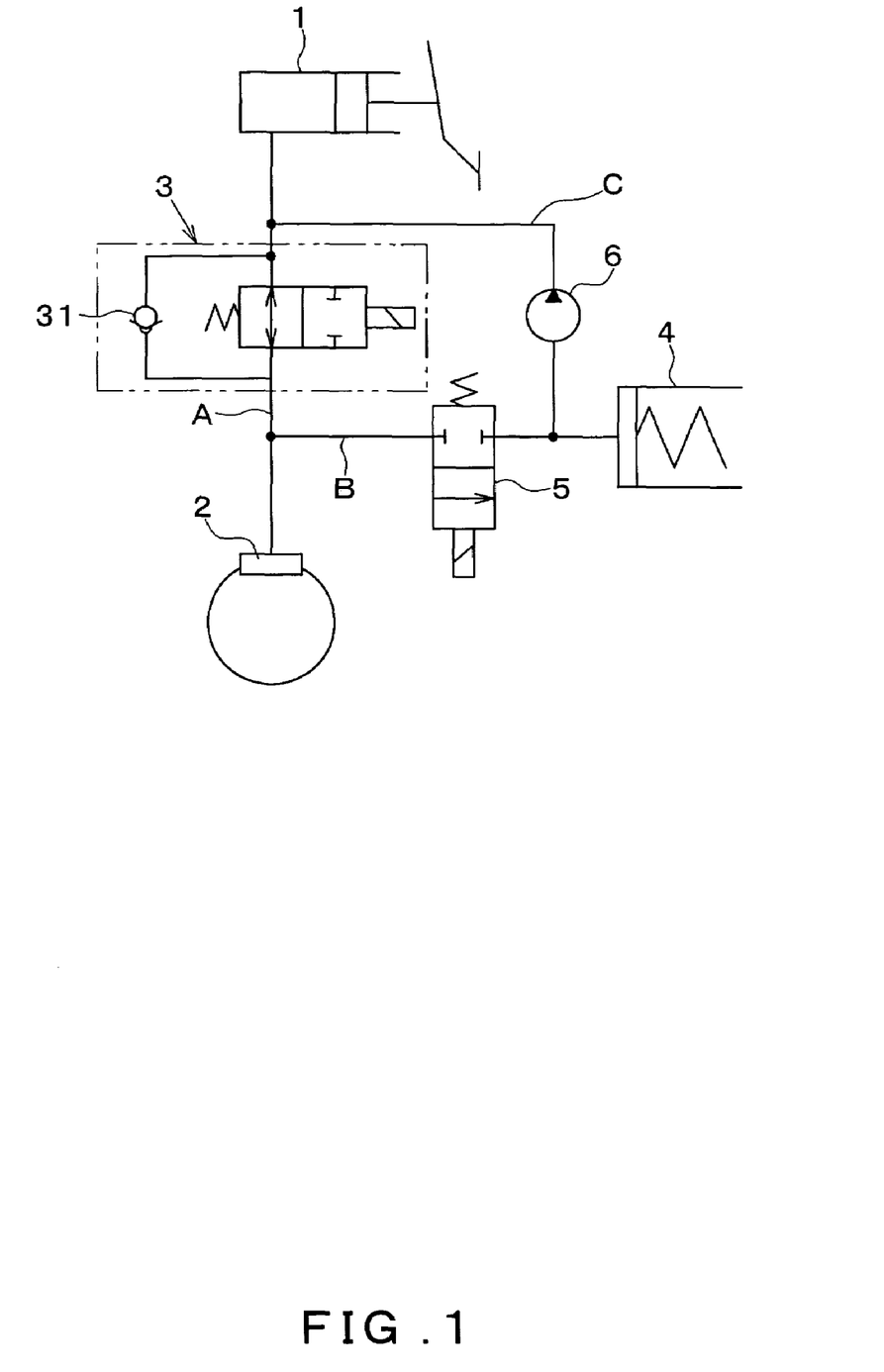
FIG. 1 is a diagram showing a line structure of a braking apparatus which employs one embodiment of the present invention.

FIG. 1 shows a line structure of a braking apparatus which employs an ABS actuator (i.e., fluid control apparatus) according to one embodiment of the present invention.

As shown in FIG. 1, a master cylinder 1 and a wheel cylinder 2 are connected to each other via a brake conduit A. Brake fluid flows from a side of the master cylinder 1 side to a side of the wheel cylinder 2 through the brake conduit A. The brake conduit A is provided with a pressure increase control valve 3 which controls opened and closed states of the brake conduit A. Note that the pressure increase control valve 3 includes a check valve 31 which only allows the brake fluid to flow from the side of the wheel cylinder 2 to the side of the master cylinder 1. The pressure increase control valve 3 corresponds to a solenoid valve according to the present invention, and a detail thereof will be described later.

A downstream side from the pressure increase control valve 3, that is, a side closer to the wheel cylinder 2 of the brake conduit A, is connected to a brake conduit B which is further connected to a reservoir 4. The brake conduit B is provided with a pressure decrease control valve 5 which controls opened and closed states of the brake conduit B. The pressure decrease control valve 5 is not opened when normal brake is applied. At a pressure decrease timing during an ABS control, the pressure decrease control valve 5 is opened so as to release the brake fluid in the brake conduit A to the reservoir 4, thereby decreasing a wheel cylinder pressure.

Furthermore, an upstream side from the pressure increase control valve 3, that is, a side closer to the master cylinder 1 of the brake conduit A, is connected to the reservoir 4 via a brake conduit C. The brake conduit C is provided with a pump 6 which sucks up and discharges the brake fluid which is released to the reservoir 4, allowing the brake fluid to be returned to the brake conduit A.

Figure 2:
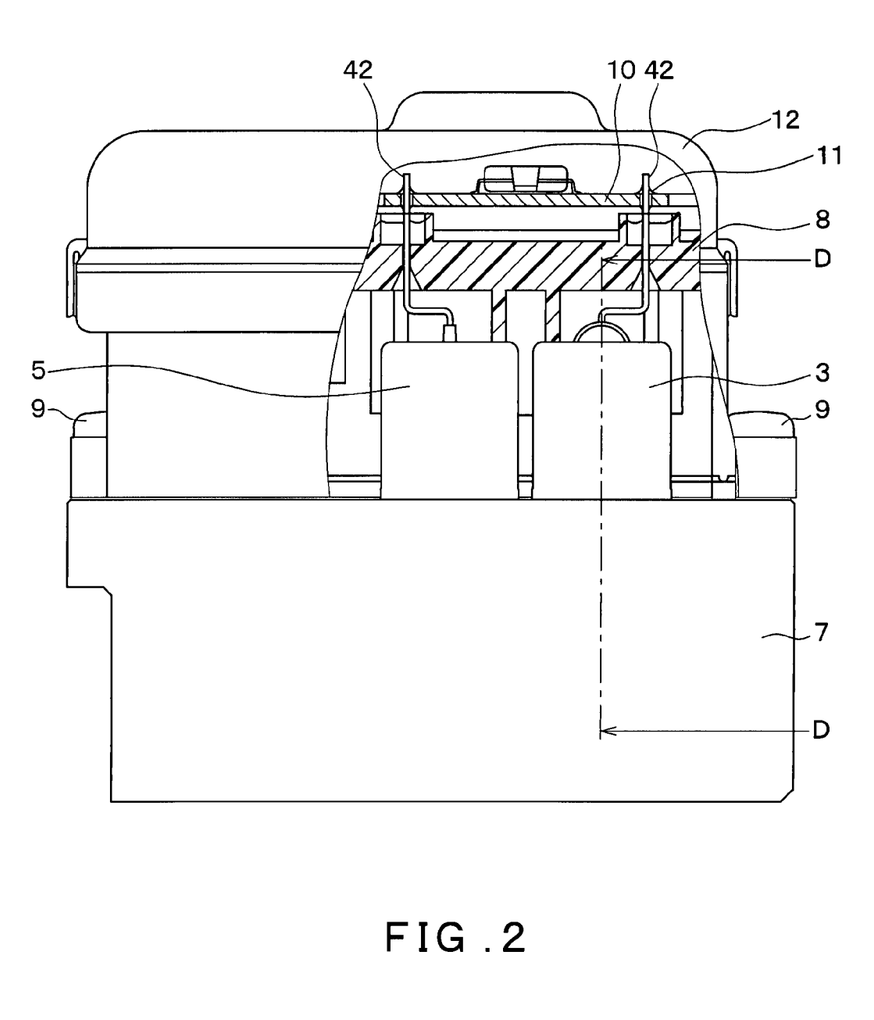
FIG. 2 is a partial sectional view of an ABS actuator according to the embodiment.

FIG. 2 is a partial sectional view of a configuration of the ABS actuator. In FIG. 2, the reservoir 4 (see FIG. 1) and the pump 6 (see FIG. 1) are accommodated in a housing 7 made of aluminum. The pressure increase control valve 3 and the pressure decrease control valve 5 are arranged side by side on one side surface of the housing 7. Furthermore, a case 8 made of resin is secured to the housing 7 with screws 9, and the pressure increase control valve 3 and the pressure decrease control valve 5 are retained between the housing 7 and the case 8.

A cover 12 for accommodating a substrate 10 and a motor drive circuit is attached to the case 8. Furthermore, terminals 42 extended from respective coils of the pressure increase control valve 3 and the pressure decrease control valve 5 are soldered to the substrate 10 at soldering portions 11. Note that the case 8 and the cover 12 are formed of resin such as PBT and nylon.

Figure 3:
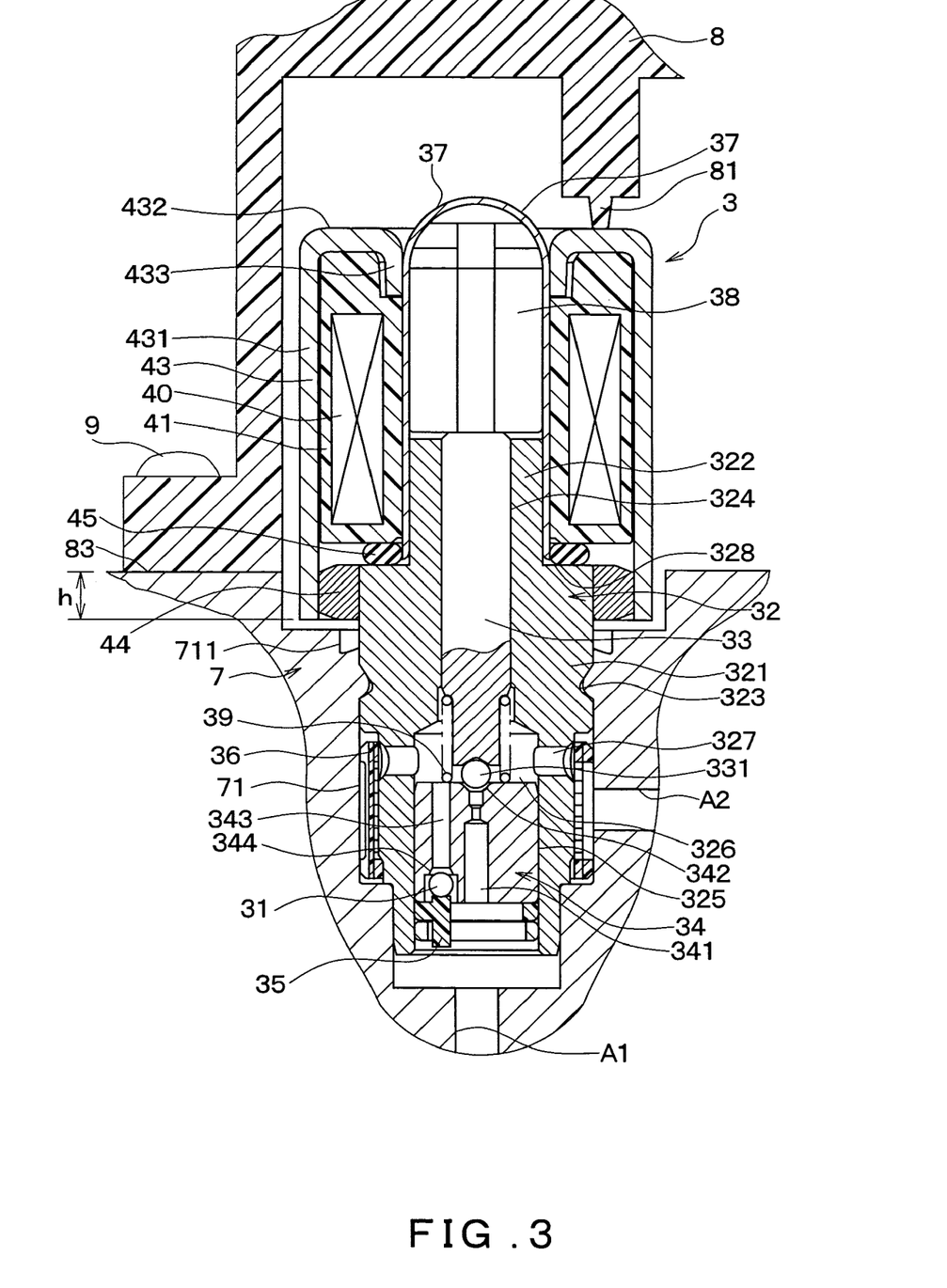
FIG. 3 is a sectional view of FIG. 2 cut along a line D—D.

FIG. 3 is a sectional view of FIG. 2 cut along a line D—D, showing a section of the pressure increase control valve 3 when it is disposed in the housing 7 of the ABS actuator. Hereinafter, the configuration of the pressure increase control valve 3 will be explained referring to FIG. 3.

In FIG. 3, the housing 7 is provided with a recess portion 71 which is used for assembling the pressure increase control valve 3. The recess portion 71 is formed so as to be communicated with the brake conduit A which is provided in the housing 7. Specifically, a brake conduit A1 which is upstream from the pressure increase control valve 3 of the brake conduit A is connected to the master cylinder 1, and a brake conduit A2 which is downstream from the pressure increase control valve 3 is connected to the wheel cylinder 2. Note that the brake conduit A1 and the brake conduit A2 correspond to a fluid passage according to the present invention.

The pressure increase control valve 3 is provided with a guide 32 which serves as a magnetic path member made of a magnetic material. The guide 32 is shaped into a column with a step, and a side of a large diameter portion 321 of the guide 32 is fitted into the recess portion 71 of the housing 7. Moreover, a small diameter portion 322 and a part of the large diameter portion 321 protrude toward the outside of the recess portion 71. Furthermore, an opening end portion 711 of the recess portion 71 is clamped, whereby a part of the housing 7 enters a dent 323 on an outer peripheral surface of the large diameter portion 321. Accordingly, the guide 32 is secured to the housing 7.

The guide 32 is provided with a guide hole 324, a seat insertion hole 325, and a communication hole 327. The guide hole 324 positioned at a side of the small diameter portion 322 holds a shaft 33 such that the shaft 33 is slidable. The seat insertion hole 325 is positioned at the side of the large diameter portion 321, and a seat 34 is pressed into the seat insertion hole 325. Moreover, through the communication hole 327, a space 326 surrounded by the seat 34 and the seat insertion hole 325 is communicated with the brake conduit A2.

The shaft 33 is formed into a columnar shape and made of a non-magnetic metal (such as stainless steel). A side of an end portion on the seat 34 of the shaft 33 protrudes from the guide hole 324 of the guide 32 toward the space 326, and a spherical valve element 331 is welded to a distal end of the end portion.

The seat 34 is formed into a cylindrical shape, and provided with a first communication path 341 at a central portion thereof in the radial direction. The first communication path 341 communicates the space 326 in the guide 32 with the brake conduit A1. Furthermore, a tapered first valve seat 342 is provided at an end portion of the first communication path 341 on a side of the space 326. The valve element 331 of the shaft 33 contacts or separates from the first valve seat 342.

Furthermore, the seat 34 is provided, in parallel to the first communication path 341, with a second communication path 343 which communicates the space 326 in the guide 32 with the brake conduit A1. Further a tapered second valve seat 344 is provided at an end portion of the second communication path 343 on a side of the brake conduit A1. The check valve 31 with a spherical shape contacts or separates from the second valve seat 344.

The check valve 31 is held by a filter 35 at a position facing the second valve seat 344. The filter 35 is pressed into a side of the end portion of the seat insertion hole 325 of the guide 32. Another filter 36 is disposed on an outer periphery of the large diameter portion 321 of the guide 32 so as to surround the communication hole 327. These filters 35 and 36 prevent a foreign matter which contaminates the brake fluid from further entering the pressure increase control valve 3.

A sleeve 37 is fitted into the outer peripheral side of the small diameter portion 322 of the guide 32. The sleeve 37, made of a non-magnetic material (such as stainless steel), has a cup-like shape with one end opened, and the cup has a generally spherical bottom surface.

Furthermore, a plunger 38, made of a magnetic material, with a generally columnar shape is disposed on a side of the bottom surface of the sleeve 37. The plunger 38 is slidable in the sleeve 37 and contacts the bottom surface of the sleeve 37. When the plunger 38 contacts the bottom surface of the sleeve 37, sliding of the plunger 38 in the upward direction in the drawing is inhibited.

The shaft 33 is urged to a side of the plunger 38 by a spring 39 which is disposed between the shaft 33 and the seat 34. The shaft 33 and the plunger 38 always abut with each other such that they are integrally operated. Note that the shaft 33 and the plunger 38 configure a movable member (to be described later) moving corresponding to presence or absence of current application to a coil.

A spool 41 with a cylindrical shape is disposed around the sleeve 37. The spool 41 accommodates a coil 40 which forms a magnetic field when current is applied to the coil 40. The spool 41 is made of resin (such as nylon), by attaching the coil 40 thereto after carrying out a primary molding, and subsequently carrying out a secondary molding.

The terminal 42 (see FIG. 2) is extended from the coil 40 and soldered to the substrate 10 (see FIG. 2). Accordingly, current is applied to the coil 40 via the terminal 42.

Moreover, a yoke 43 made of a magnetic material is disposed on the outer periphery of the spool 41. The yoke 43 with a generally cup-like shape includes an external cylindrical portion 431, a brim portion 432 and an internal cylindrical portion 433. The brim portion 432 extends inward in the radial direction from an end portion of the external cylindrical portion 431 on a side of the case 8. The internal cylindrical portion 433 extends toward the side of the housing 7 in the axial direction from an inner peripheral portion of the brim portion 432. Moreover, the spool 41, the sleeve 37 and the like can be accommodated through an opening of the external cylindrical portion 431 on the side of the housing 7.

A ring member 44 made of a magnetic material is pressed into the inner peripheral surface of the opening of the external cylindrical portion 431 on the side of the housing 7. The ring member 44 is disposed so as to surround the large diameter portion 321 of the guide 32.

The spool 41 is loosely fitted into the yoke 43 so as to be relatively movable with respect to the yoke 43. Furthermore, the spool 41, the yoke 43, and the ring member 44 are loosely fitted into the guide 32 and the sleeve 37, so as to be relatively movable with respect to the guide 32 and the sleeve 37. Note that the coil 40, the spool 41, the yoke 43 and the ring member 44 configure a coil portion of the present invention, and the coil 40 and the yoke 43 configure a main portion of the coil portion.

An elastic member 45, with a ring-like shape and formed of silicon rubber or the like, is disposed on an end surface of the coil portion on the side of the housing 7, more specifically, between the spool 41 and the guide 32.

Figure 4A:
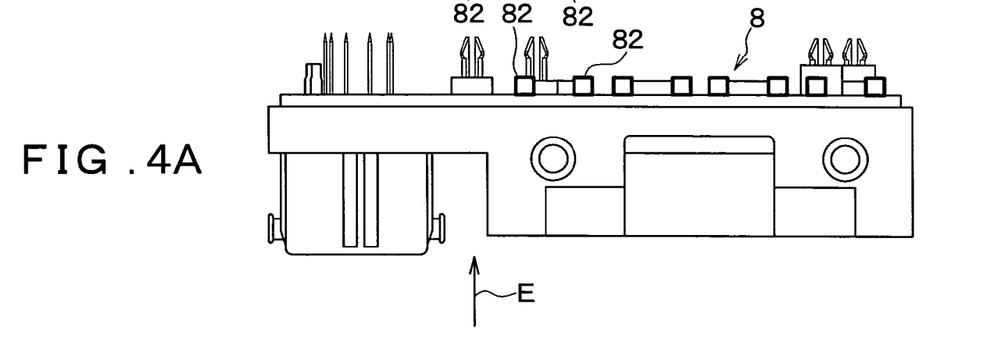
FIG. 4A is a front view of a case.
Figure 4B:
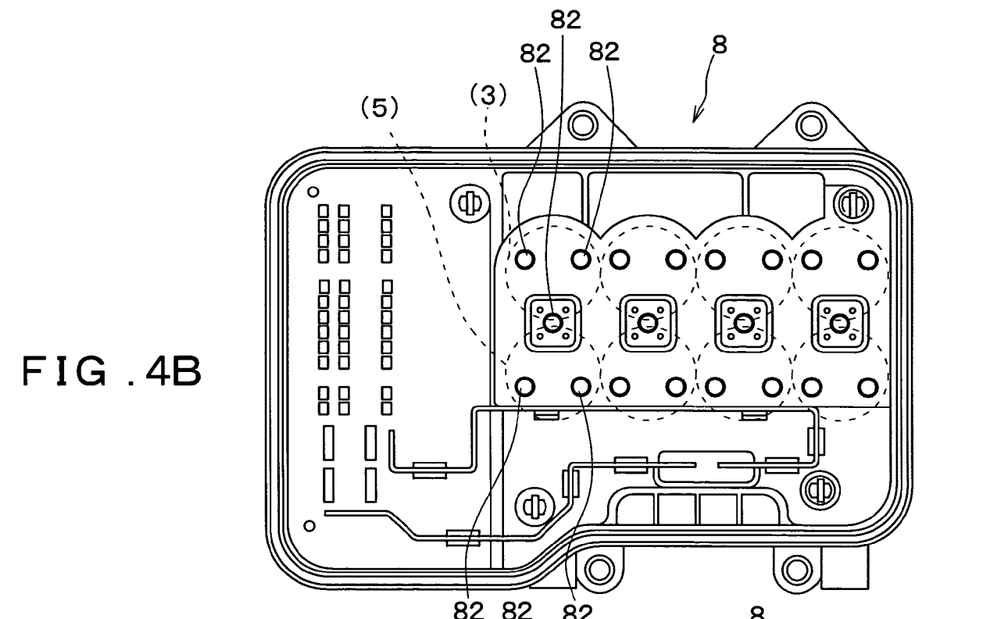
FIG. 4B is a plan view of FIG. 4A.
Figure 5:
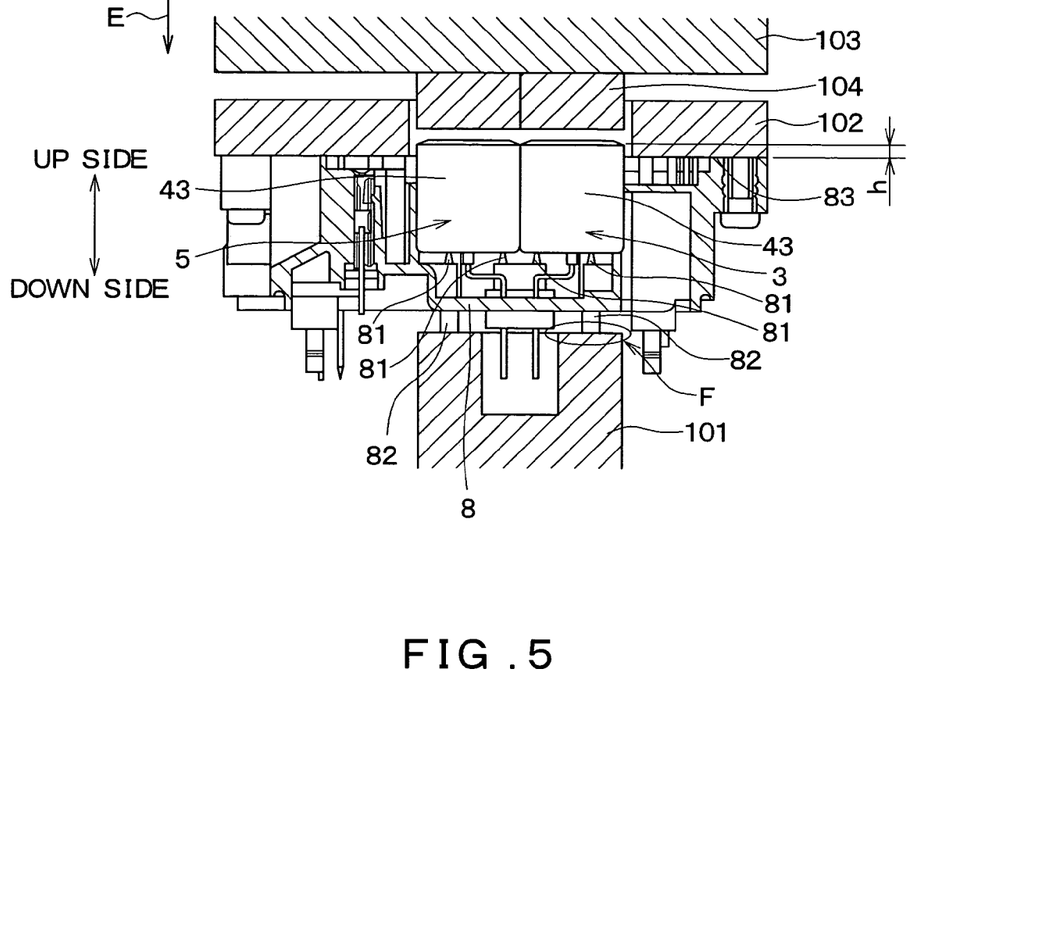
FIG. 5 is a sectional view showing an adjustment process of a coil height of a pressure increase control valve in FIG. 2.
Figure 6:
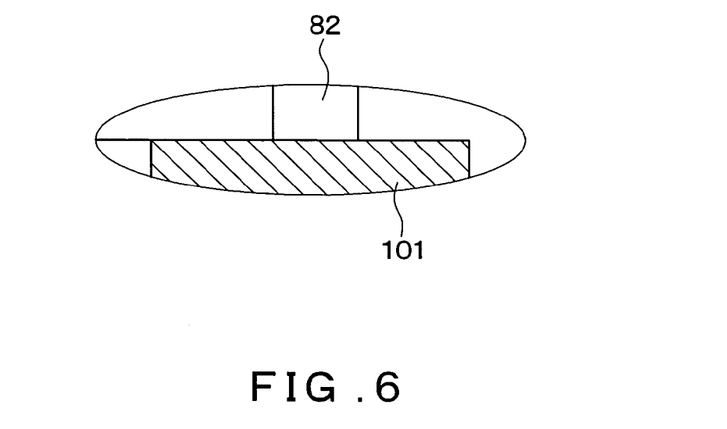
FIG. 6 is an expanded sectional view of portion F in FIG. 5.

FIG. 4A is a front view of the case 8, and FIG. 4B is a plan view of FIG. 4A. FIG. 5 is a sectional view showing an adjustment process of a coil height h (to be described later in detail), and FIG. 6 is an expanded sectional view of portion F in FIG. 5. Note that in FIG. 4B, for the sake of convenience, broken lines are used to show positions of the pressure increase control valve 3 and the pressure decrease control valve 5, in order to clarify a positional relationship therebetween.

Hereafter, the configuration of the case 8 will be explained with reference to FIGS. 3 to 6. One end surface of the case 8 is provided with coil-supporting protruding portions 81 with a truncated cone shape, which protrude toward a side of the brim portion 432 of the yoke 43. The other end surface of the case 8 is provided with jig-supporting protruding portions 82 with a columnar shape, which protrude toward a side of a supporting jig 101 (to be explained later in detail).

Each coil-supporting protruding portion 81 has a thin shape, so as to be easily deformed and crushed when the coil portion is pressed toward the side of the case 8 by a pressing jig 103 (to be explained later in detail). On the other hand, each jig-supporting protruding portion 82 has a larger sectional area than the coil-supporting protruding portion 81, such that the jig-supporting protruding portion 82 is hardly deformed even when the coil portion is pressed by the pressing jig 103 to the side of the case 8.

Three coil-supporting protruding portions 81 are provided for each arrangement position of the pressure increase control valve 3. Meanwhile, as apparent from FIG. 4B, five jig-supporting protruding portions 82 are provided for each arrangement position of the paired pressure increase control valve 3 and the pressure decrease control valve 5. Specifically, one of the five jig-supporting protruding portions 82 is positioned between the two pressure increase control valves 3 (i.e., at an adjacent portion), and the other four jig-supporting protruding portions 82 are disposed at a position where the jig-supporting protruding portions 82 and the coil-supporting protruding portions 81 overlap each other, when viewed in a direction E where the pressing jig 103 presses the coil portion. More specifically, the four jig-supporting protruding portions 82 are arranged coaxially with the coil-supporting protruding portion 81, when viewed in the direction E where the pressing jig 103 presses the coil portion.

Before the pressure increase control valve 3 with the above described configuration is assembled to the housing 7 and the case 8, the coil 40, the spool 41, the terminal 42, the yoke 43 and the ring member 44 of the pressure increase control valve 3 are integrated into the coil portion, and the other parts such as the guide 32 and the shaft 33 are integrated into a valve portion.

Next, the guide 32 of the valve portion is fitted into the recess portion 71 of the housing 7, and the opening end portion 711 of the recess portion 71 is clamped, whereby the guide 32 is secured to the housing 7. Accordingly, the valve portion is secured to the housing 7.

Meanwhile, the terminal 42 of the coil portion is soldered to the substrate 10. Furthermore, the coil portion is pressed by the pressing jig 103 to the side of the case 8, whereby the coil-supporting protruding portion 81 is crushed to a predetermined position. Accordingly, the coil height h is adjusted such that it falls within a tolerance range. The above-described adjustment of the coil height h ensures that the guide 32 and the ring member 44 which form a magnetic path member overlap each other, in a state where the pressure increase control valve 3 is retained between the housing 7 and the case 8 (hereinafter referred to as control valve retained state). Accordingly, an area for the magnetic path member between the guide 32 and the ring member 44 is adequately provided. Furthermore, the above-described adjustment of the coil height h provides a space for installing the elastic member 45 in the control valve retained state.

Next, the coil portion is assembled to the valve portion, by attaching the elastic member 45 to the outer peripheral portion of the guide 32 of the valve portion. Subsequently, the case 8 is secured to the housing 7 with the screws 9, and thus the pressure increase control valve 3 is retained between the housing 7 and the case 8.

Next, a process of the adjustment of the coil height h will be explained with reference to FIGS. 5 and 6. The coil height h refers to a distance between a contact surface (i.e., datum surface) 83 of the case 8 with the housing 7, and an end surface of the yoke 43 on the side of the housing 7.

The coil height h is adjusted as follows. First, the case 8 to which the coil portion of the pressure increase control valve 3 is attached is mounted on the supporting jig 101, in a manner such that the jig-supporting protruding portions 82 of the case 8 abut with the supporting jig 101. Next, a datum plate 102 is mounted on the contact surface 83 of the case 8 and secured thereto with screws. Accordingly, the case 8 is held by the supporting jig 101 and the datum plate 102.

Next, when the pressing jig 103 is lowered, a punch 104 coupled to the pressing jig 103 abuts with the yoke 43, and the coil portion is pressed in the direction as shown by an arrow E. Accordingly, the yoke 43 is pressed to the coil-supporting protruding portions 81, whereby the coil-supporting protruding portions 81 are crushed. At this time, the pressing jig 103 is lowered to a position at which the pressing jig 103 abuts with the datum plate 102. Subsequently, the coil height h is adjusted so as to fall within a predetermined range, by adjusting a distance from a lower end surface (i.e., surface to which the punch 104 is attached) of the pressing jig 103 to a lower end surface (i.e., surface which abuts with the yoke 43) of the punch 104. Note that the distance from the lower end surface of the pressing jig 103 to the lower end surface of the punch 104 can be adjusted by a shim (not shown) which is disposed between the pressing jig 103 and the punch 104.

Next, an operation of the pressure increase control valve 3 will be explained with reference to FIGS. 1 and 3. FIG. 3 shows an operational state of the pressure increase control valve 3 when normal brake is applied, that is, when current is not applied to the coil 40. When current is not applied to the coil 40, the shaft 33 and the plunger 38 are urged by the spring 39 toward the side of the bottom surface of the sleeve 37, whereby the plunger 38 abuts with the bottom surface of the sleeve 37. Furthermore, the valve element 331 of the shaft 33 separates from a first valve seat 342 of the seat 34, and the brake conduit A1 is communicated with the brake conduit A2 via the first communication path 341 of the seat 34, the space 326 in the guide 32 and the communication hole 327 of the guide 32. Accordingly, when normal brake is applied, the brake fluid flows between the master cylinder 1 and the wheel cylinder 2 corresponding to the depressing operation of the brake pedal.

On the other hand, at a pressure decrease timing or at a pressure retention timing during the ABS control, in other words, when closing the pressure increase control valve 3, current is applied to the coil 40. When current is applied to the coil 40, the coil 40 forms a magnetic field, and the guide 32, the plunger 38, the yoke 43 and the ring member 44 form a magnetic path. Next, the plunger 38 is attracted to a side of the guide 32 by magnetic attraction force, and the shaft 33 and the plunger 38 move toward a side of the seat 34 resisting the spring 39. Then, the valve element 331 of the shaft 33 abuts with the first valve seat 342 of the seat 34. Accordingly, the pressure increase control valve 3 is closed, and the flow of the brake fluid from the brake conduit A1 to the brake conduit A2 is shut off.

Next, at a pressure boost timing during the ABS control, application of current to the coil 40 is stopped and the pressure increase control valve 3 is opened. Accordingly, the brake fluid flows from the brake conduit A1 to the brake conduit A2.

Furthermore, depression of the brake pedal may be stopped at the pressure decrease timing or at the pressure retention timing during the ABS control, that is, when the pressure increase control valve 3 is being closed. At this moment, the check valve 31 separates from the second valve seat 344 of the seat 34 due to a pressure difference between fluid pressure of the side of the master cylinder 1 and that of the side of the wheel cylinder 2. Furthermore, the brake conduit A1 is communicated with the brake conduit A2 via the second communication path 343 of the seat 34, the space 326 in the guide 32, and the communication hole 327 of the guide 32. Therefore, the brake fluid flows from the side of the wheel cylinder 2 to the side of the master cylinder 1.

According to the present embodiment as described above, since the jig-supporting protruding portions 82 of the case 8 are formed into a protruding shape, the supporting jig 101 only abuts with the jig-supporting protruding portions 82. In other words, only a narrow area of the case 8 abuts with the supporting jig 101. Since the portion abutting with the supporting jig 101 is narrow as above, even in the case of a resin mold part, it is easy to adjust a molding die so that accuracy in flatness increases. Therefore, it is easy to make the case 8 having the jig-supporting protruding portions 82 with high accuracy in flatness. Moreover, since accuracy in flatness of the jig-supporting protruding portion 82 increases, a surface of the jig-supporting protruding portion 82 is likely to be in close contact with a surface of the supporting jig 101. Therefore, a necessity for adjusting the supporting jig 101 so as to match the waviness of the case 8 as in the conventional case is eliminated, which facilitates easy making of the supporting jig 101.

Furthermore, according to the present embodiment, since the jig-supporting protruding portion 82 has a larger sectional area than the coil-supporting protruding portion 81, it is possible to inhibit deformation of the jig-supporting protruding portion 82 caused by a press load by the pressing jig 103 when the coil height h is adjusted. Accordingly, adjustment accuracy for the coil height h can be enhanced.

Moreover, in the present embodiment, the coil-supporting protruding portion 81 and the jig-supporting protruding portion 82 are arranged such that they overlap each other, when viewed in the direction E where the pressing jig 103 presses the coil portion. Therefore bending of the case 8 in the vicinity of the coil-supporting protruding portions 81 is inhibited when the coil height h is adjusted, whereby adjustment accuracy for the coil height h can be further enhanced.

Furthermore, according to the present embodiment, the jig-supporting protruding portion 82 and the coil-supporting protruding portion 81 are coaxially disposed, when viewed in the direction E where the pressing jig 103 presses the coil portion. Therefore, bending of the case 8 in the vicinity of the coil-supporting protruding portions 81 is inhibited more reliably when the coil height h is adjusted, whereby adjustment accuracy for the coil height h can be yet further enhanced.

While the above description is of the preferred embodiments of the present invention, it should be appreciated that the invention may be modified, altered, or varied without deviating from the scope and fair meaning of the following claims.

What is claimed is:

1. A fluid control apparatus comprising:
   solenoid valves, each solenoid valve including a coil portion in which a coil forming a magnetic field when current is applied to the coil is accommodated in a yoke made of a magnetic material;
   a housing provided with fluid passages that are opened and closed by the solenoid valves;
   a case which, in cooperation with the housing, retains the solenoid valves;
   coil-supporting protruding portions on one end surface of the case, so as to protrude from the one end surface of the case and abut with the coil portion, each coil-supporting protruding portion being deformed by pressing the coil portion to the coil-supporting protruding portion, in a state where the other end surface of the case is supported by a supporting jig; and
   jig-supporting protruding portions on the other end surface of the case, so as to protrude from the other end surface of the case and abut with the supporting jig.

2. The fluid control apparatus according to claim 1, wherein the jig-supporting protruding portion has a larger sectional area than the coil-supporting protruding portion.

3. The fluid control apparatus according to claim 1, wherein the jig-supporting protruding portion and the coil-supporting protruding portion overlap each other, when viewed in a direction where the pressing jig presses the coil portion.

4. The fluid control apparatus according to claim 2, wherein the jig-supporting protruding portion and the coil-supporting protruding portion overlap each other, when viewed in a direction where the pressing jig presses the coil portion.

5. The fluid control apparatus according to claim 1, wherein the jig-supporting protruding portion and the coil-supporting protruding portion are coaxially arranged, when viewed in a direction where the pressing jig presses the coil portion.

6. The fluid control apparatus according to claim 2, wherein the jig-supporting protruding portion and the coil-supporting protruding portion are coaxially arranged, when viewed in a direction where the pressing jig presses the coil portion.

7. The fluid control apparatus according to claim 3, wherein the jig-supporting protruding portion and the coil-supporting protruding portion are coaxially arranged, when viewed in a direction where the pressing jig presses the coil portion.

8. The fluid control apparatus according to claim 4, wherein the jig-supporting protruding portion and the coil-supporting protruding portion are coaxially arranged, when viewed in a direction where the pressing jig presses the coil portion.

* * * * *